United States Patent [19]

Shishkin et al.

[11] Patent Number: 4,738,742
[45] Date of Patent: Apr. 19, 1988

[54] METHOD OF PROTECTING THE INTERNAL SURFACE OF PIPELINE AGAINST CORROSION AND APPARATUS FOR PERFORMING SAME

[75] Inventors: Viktor V. Shishkin; Nikolai F. Kryazhevskikh, both of Krasnodar, U.S.S.R.

[73] Assignee: Trest "Juzhvodoprovod", Krasnodar, U.S.S.R.

[21] Appl. No.: 882,886
[22] PCT Filed: Oct. 16, 1985
[86] PCT No.: PCT/SU85/00088
    § 371 Date: Jun. 9, 1986
    § 102(e) Date: Jun. 9, 1986
[87] PCT Pub. No.: WO86/02430
    PCT Pub. Date: Apr. 24, 1986

[30] Foreign Application Priority Data

| Oct. 17, 1984 | [SU] | U.S.S.R. | 3798420 |
| Oct. 17, 1984 | [SU] | U.S.S.R. | 3797421 |
| Oct. 17, 1984 | [SU] | U.S.S.R. | 3797412 |
| Oct. 17, 1984 | [SU] | U.S.S.R. | 3797652 |
| Oct. 17, 1984 | [SU] | U.S.S.R. | 3797406 |
| Oct. 17, 1984 | [SU] | U.S.S.R. | 3797662 |
| Oct. 17, 1984 | [SU] | U.S.S.R. | 3797916 |
| Oct. 17, 1984 | [SU] | U.S.S.R. | 3797418 |
| Oct. 17, 1984 | [SU] | U.S.S.R. | 3797658 |
| Oct. 17, 1984 | [SU] | U.S.S.R. | 3797424 |
| Oct. 17, 1984 | [SU] | U.S.S.R. | 3797913 |
| Oct. 17, 1984 | [SU] | U.S.S.R. | 3797914 |

[51] Int. Cl.[4] ............................................. B24C 27/16
[52] U.S. Cl. .................................. 156/391; 156/287; 156/294; 156/499; 264/267
[58] Field of Search .............. 156/294, 287, 391, 499; 264/267, 269; 118/306

[56] References Cited

U.S. PATENT DOCUMENTS 2,478,711  8/1949  Robinson et al. ............ 118/306 X
2,865,321  12/1958  Von Arx ...................... 118/306
4,135,958  1/1979  Wood ........................... 156/294 X
4,334,943  1/1982  Zenbayashi .................. 156/287

FOREIGN PATENT DOCUMENTS 115993   8/1984  European Pat. Off. .
2091372  7/1982  United Kingdom .
542890   2/1977  U.S.S.R. .
1018729  6/1983  U.S.S.R. .
1024653  6/1983  U.S.S.R. .

OTHER PUBLICATIONS

"Lining Trailer Equipment", Manual A-101, Date: 9/15/78, Contract Number: 56-4/88084-422.
"The Spunline Process", Customer-Furnished Tools and Equipment, Manual AR-1, Ameron.
"The Spunline Process", Published Materials on Pipeline Rehabilitation, Manual AR-2, Ameron.

Primary Examiner—David Simmons
Attorney, Agent, or Firm—Lilling & Greenspan

[57] ABSTRACT

A method consists in introducing a flexible sleeve (4) into a pipeline (2), advancing the sleeve through the pipeline (2) and urging it against the internal surface of the pipeline (2) by building up excessive pressure in the space defined by the pipeline (2) and the sleeve (4), the latter having its end turned inside out and secured to the internal surface of the pipeline (2). To join the sleeve (4) to the pipeline (2) and provide a protective coating on the internal surface of the pipeline (2), the latter is heated from inside.

An apparatus for performing the method includes a system (1) for supplying a working fluid into the pipeline (2), a system for introducing a flexible sleeve (4) into the pipeline (2), means for heating the pipeline (2) and a system for timing the motion of the sleeve (4) and of the heating means. In the preferred embodiment of the invention the heating means includes an induction heater (18) arranged for longitudinal motion inside the pipeline (2) in front of the advancing sleeve (4) and electrically connected with a source (7) of electric current.

2 Claims, 11 Drawing Sheets

METHOD OF PROTECTING THE INTERNAL SURFACE OF PIPELINE AGAINST CORROSION AND APPARATUS FOR PERFORMING SAME

BACKGROUND OF THE INVENTION

1. Field of the Invention

The present invention relates to construction and operation of main and distribution networks of pressure and pressure-free pipelines, and more particularly it relates to a method of protecting the internal surface of a pipeline against corrosion and to an apparatus capable of performing this method.

2. Description of the Prior Art

Nowadays the problem of affording protection to the internal surfaces of pipelines has become acute. It is particularly acute in what concerns the protection of the internal surfaces of pipelines either under construction or already in operation without the use of adhesive or cementing substances. As the internal surface of a pipeline is moistened by either the fluid being conveyed, e.g. water, or by dew, this surface has to be dried prior to being coated with a flexible sleeve of the coating material.

The drying of the surface being coated has to conducted immediately before the urging of the protective sleeve against the inner wall of the pipeline, for a surface dried in advance might be moistened once again from the atmospheric air by the moment of the application of the protective coating.

At present, there are known various methods and devices for protecting the internal surface of a pipeline against corrosion, e.g. by employment of a cement-sand mixture such as a plant for applying a cement-sand mixture marketed by Ameron Inc., USA.

A shortcoming of this process is its low productivity, with a single unit being operable within one day only 690 meters of pipeline with the diameter of 700 mm may be coated.

There is known another method of protecting the internal surface of a pipeline, including introducing into the pipeline a flexible sleeve of the coating material, which is urged against the internal surface of the pipeline which has been preheated in advance.

The apparatus for performing this method comprises a system for feeding a working fluid into the pipeline, a system for introducing a flexible sleeve, a device for heating the pipeline, and a system for timing the advance of the sleeve and of the heating device (cf. SU Inventor's Certificate No. 1024653, F16L 58/16, 1980).

These method and apparatus are not suitable for protecting against corrosion of lengthy pipelines either under construction or already in operation, with the protective coating being applied with the employment of heating. This is explained by the fact that in the known apparatus the heating device is in the form of an annular oven mounted in the pipeline. In practice, such an oven would not be moved along an extended pipeline with appropriate timing of the advance of the oven and of the sleeve being introduced into the pipeline.

The abovedescribed apparatus is operated under factory conditions and cannot be used for protection of pipelines laid into the soil or supported on an elevated structure.

SUMMARY OF THE INVENTION

The present invention seeks to provide a method of protecting the internal surface of a pipeline against corrosion, which would ensure an effective heating of the internal surface of a pipeline having already been laid with substantial simplification of the technology of protection.

This is attained by a method of protecting the internal surface of a pipeline, consisting in introducing into a pipeline a flexible sleeve having its end portion secured to the internal surface of the pipeline, moving the sleeve and urging it against the internal surface of a pipeline by building up excessive pressure in the space defined by the pipeline and the sleeve, and heating the pipeline. In accordance with the invention, the heating of the pipeline is effected from inside.

The herein disclosed method provides for producing a protective coating not only in a pipeline under construction but also in an existing pipeline laid in the soil or mounted on an elevated structure. This has been made possible owing to the heating of the pipeline being effected from the inside. Thus, there has been eliminated the need for conducting a large volume of work involved in digging out an operating pipeline, or else removing it from a supporting structure, e.g. a trestle. This, in its turn, yields considerable reduction of the cost of a protective coating made on the internal surface of a pipeline.

An apparatus for performing the herein disclosed method, for feeding a working fluid into the pipeline comprises a system for introducing a flexible sleeve into the pipeline, means for heating the pipeline and a system for timing the advance of the sleeve and of the heating means. In accordance with the invention, the heating means includes an induction heater positioned inside the pipeline for longitudinal motion in front of the advancing sleeve and electrically connected to a source of electric current through a cable extending through the sleeve and through the system for introducing the sleeve into the pipeline.

The herein disclosed appartus makes it possible to coat the internal surface of a pipeline with thermoplastic materials by means of simultaneous introduction into the pipeline of the sleeve and of the heating means.

The disclosed appratus is operable for internally coating pipelines laid in the soil or supported on elevated structures, the coating being applied onto the internal surface of both the pipeline proper and its fittings, e.g. valves, gates, air vents, etc. The local heating of the inner wall of the pipeline is effected immediately before pressing the sleeve against this wall of the pipeline, which provides for saving power, as an optimally limited surface of the pipeline has to be locally heated. Furthermore, with the sleeve and the heating means being advanced through the pipeline at the same speed and at a constant spacing from one another, the temperature of local heating of the inner wall of the pipeline remains constant, which upgrades the coating quality.

To time the advance of the sleeve and of the induction heater, the latter is rigidly connected with a drum for winding the cable connecting the induction heater with the source of electric current.

According to one embodiment of the present invention, the heating means includes a heat-exchanger incorporated in the system for feeding the working fluid into the pipeline, in front of the advancing sleeve.

This provides for controlling the pressure drop across the two sides of the sleeve, and also for drying the inner wall of the pipeline in front of the advancing sleeve.

The controllable pressure drop can be utilized for regulating the speed of the motion of the apparatus in the pipeline, the wall-heating temperature and the effort of urging or pressing the sleeve. This provides for enhancing the quality of the coating produced.

According to another embodiment of the invention, the heating means includes a gas generator connected through hoses with the internal space of the pipeline in front of the advancing sleeve, and with the space defined by the sleeve and the pipeline.

This construction provides for simultaneously heating and drying pipelines of an extended length, and also provides for controlling the heating and cooling of the pipeline, so as to minimize relaxation of the coating, and, consequently, to enhance its quality.

According to yet another embodiment of the invention, the heating means includes heating elements connected to a source of electric current and mounted on an auxiliary flexible sleeve adapted to be introduced into the main sleeve.

This provides for enhancing the durability of the applied coating owing to the significant reduction of the relaxation stain in the coating being produced, due to the heating of the sleeve and of the pipeline and then the cooling of the pipeline and of the coating taking place simultaneously, over the entire length of the pipeline being coated.

It is quite expedient that the heating means should include an induction heater accommodated in the sleeve, electrically connected with a source of electric current arranged outside the pipeline.

This provides for smoothing out the sleeve by the housing of the inductor heater in the course of heating the wall of the pipeline and fusing the sleeve, which enhances the adhesion of the sleeve to the surface of the pipeline owing to their more initimate contact.

According to still another embodiment of the present invention, the heating means includes an induction heater arranged for longitudinal motion in front of the advancing sleeve, electrically connected to a source of electric current, an auxiliary sleeve being arranged in front of the induction heater, receiving thereinside the said cable.

This embodiment makes it possible to coat a pipeline with non-fusible materials, e.g. carbon-filled plastics or glass fibres without their melting. The additional sleeve may be relatively thick (10 to 20 mm), which makes it possible to use such pipeline for conveying aggressive fluids.

In still another embodiment of the present invention the heating means includes means for supplying a combustible mixture into the space defined by the pipeline and the sleeve, an ignition device accommodated in the pipeline, and a torch accommodated in the pipeline for longitudinal travel.

This emboidment significantly simplifies the technology of coating pipelines of a considerable length, while reducing the energy input into heating the internal surface of the pipeline and fusing the sleeve.

It is expedient that the gas generator should communicate with the internal space of the pipeline in front of the advancing sleeve, this space communicating through the sleeve with the atmosphere.

This provides for simultaneously drying and heating the wall of the pipeline, while building up a counter-pressure ahead of the sleeve, which allows for coating the pipeline with thinner coating sleeves.

In one embodiment of the invention the heating means includes a rocket engine arranged in front of the advancing sleeve, having its nozzles facing the internal surface of the pipeline.

This construction of the apparatus provides for speeding up the process of heating and drying the pipeline and allows for building up a counter-pressure in front of the advancing sleeve, which enables to step up the rate of the application of the coating and to avoid bursting of the sleeve.

According to yet another embodiment of the ivnention, the heating means includes a gas generator communicating with the space inside the pipeline in front of the sleeve, the sleeve being received inside an auxiliary sleeve whose melting point is higher than that of the main or inner sleeve.

This provides for coating the inner surface of a pipeline with a material with a high melting point, e.g. glass fibres.

According to still another embodiment of the invention, the heating means includes a receptacle for a metal melt having a negative potential relative to the potential of the metal of the pipeline, the receptacle being received in the pipeline in front of the sleeve and communicating with a centrifuge being in contact with the sleeve.

This construction of the apparatus provides for applying the melt onto the inner surface of the pipeline, thus achieving additional electrochemical (cathode) protection of the pipeline against corrosion, which enhances the reliability and durability of the pipeline.

BRIEF DESCRIPTION OF THE DRAWINGS

The invention will be further described in connection with embodiments thereof, with reference being made to the accompanying drawings, wherein.

DESCRIPTION OF THE PREFERRED EMBODIMENTS

A method of protecting the internal surface of a pipeline consists of the steps of introducing a flexible sleeve 5 into the pipeline, the end of the sleeve being turned inside out and secured to the inner surface of the pipeline. The introduction of the sleeve is effected by building up an excessive pressure in the space defined by the pipeline and the sleeve. Simultaneously with the introduction of the sleeve into the pipeline, the pipeline is locally heated from inside.

Figure 1:
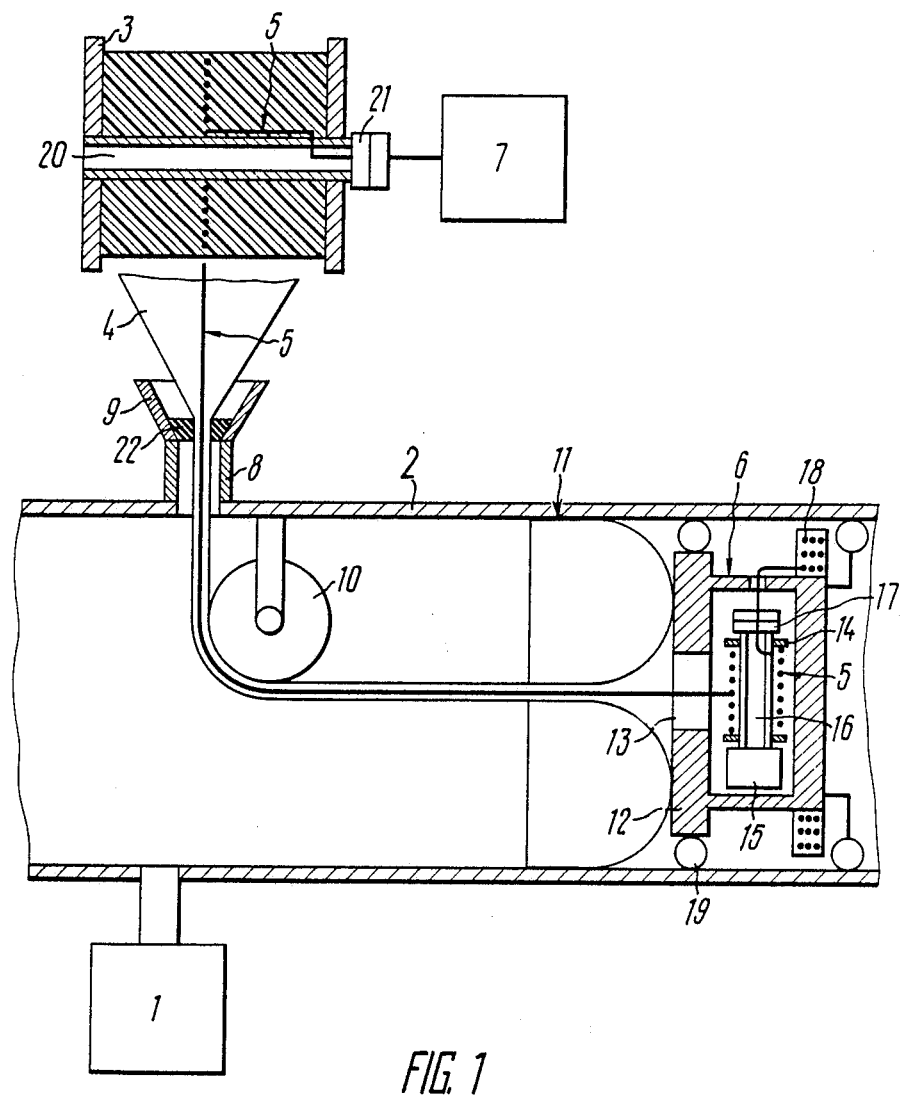
FIG. 1 illustrates an apparatus for protecting the internal surface of a pipeline against corrosion.

An apparatus capable of performing the disclosed method comprises a system 1 (FIG. 1) for supplying a working fluid or agent into a pipeline 2, arranged externally of the pipeline 2; a drum 3 with a supply of a flexible sleeve 4 accommodating therein a power cable 5, and an annular electric oven 6 arranged inside the pipeline 2 in front of the sleeve 4. The electric oven 6 is connected via the power cable 5 with a source 7 of electric current. The system 1 may be in the form of a compressor; and the sleeve 4 can be made of a polymeric material, e.g. polyethylene, or of metal foil, e.g. aluminum foil, or else of glass fiber fabric, or of some other thermally fusible material.

The sleeve 4 passes through a connection pipe 8 mounted on the pipeline 2 and provided with a guiding funnel 9, the sleeve 4 further running about a guiding roller 10 accommodated within the pipeline 2. An end 11 of the sleeve 4 inside the pipeline is turned inside out and secured to the internal surface of the pipeline 2.

The annular electric oven 6 includes a carrier disc 12 with a central opening 13 through which the power cable 5 extends on its way toward a winding drum 14 with a drive motor 15. A shaft 16 of the drum 14 is hollow, for the power cable 5 to extend through this shaft, the cable 5 being electrically connected to a contact means 17 mounted on this shaft 16. An induction heater 18 is also electrically connected to the contact means 17. The oven 6 is mounted inside the pipeline 2 on wheels 19, in front of the advancing sleeve 4.

A shaft 20 of the drum 3 is likewise hollow, for the power cable 5 to pass therethrough toward a rotary contact means 21 mounted on the shaft 20 and electrically connected to the source 7 of electric current. The connection pipe 8 is provided with a sealing means 22.

The apparatus operates as follows.

The compressor is operated to feed compressed air into the pipeline 2, and the induction heater 18 of the annular oven 6 is turned on.

Owing to the pressure of the compressed air, the sleeve 4 advances in the pipeline 2 and is pressed into intimate contct with its heated internal surface, at the same time pushing the annular oven 6 further on through the pipeline 2. While thus advancing, the sleeve 4 is fused or welded to the internal surface of the pipeline 2. As the sleeve 4 is being thus advanced, the drum 14 is actuated by the appropriate drive motor to take up the slack in the power cable 5, maintaining the carrier disc 12 of the annular oven 6 in firm engagement with the advancing sleeve 4. In this way steady progress of the annular oven 6 in front of the advancing sleeve 4 is ensured.

Figure 2:
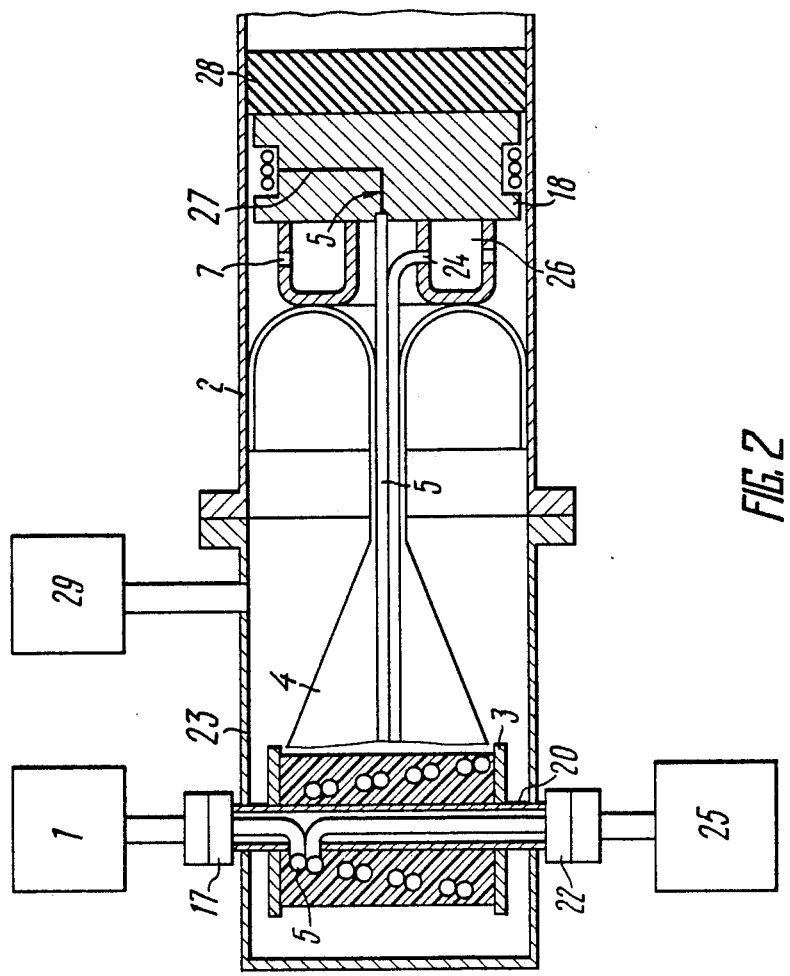
FIG. 2 illustrates another embodiment of the apparatus for protecting the internal surface of a pipeline against corrosion.

A modification of the herein disclosed apparatus, illustrated in FIG. 2, comprises a sealed receptacle 23 accommodating therein the drum 3 with the supply of the sleeve 4 receiving therein a hose 24 and the power cable 5 extending through it. The sleeve 4 can be made of a polymeric material, e.g. polyethylene, of metal foil, e.g. aluminum foil, of glass fibre fabric or of some other thermally fusible material.

The cable 5 is connected through the hollow shaft 20 of the drum 3 to the contact means 17 connected to a source 7 of electric current.

The hose 24 is connected through the hollow shaft 20 of the drum 3 and through the rotative seal 22 to a vacuum pump 25. The opposite end of the hose 24 communicates with an annular space 26 of the induction heater 18, provided with orifices 27. A piston 28 is mounted inside the pipeline 2 in front of the induction heater 18. The inner space of the pipeline 2 communicates with the atmosphere via a connection pipe 29.

The apparatus illustrated in FIG. 2 operates as follows.

The vacuum pump 25 is operated to create suction in front of the sleeve 4, and electric current is turned on to flow from the source 7 to the induction heater 18, which heats the pipeline 2.

Owing to the atmospheric air flowing in through the connection pipe 29 into the pipeline 2, the sleeve 4 is advanced through the pipeline 2 in engagement with its heated internal surface, fusing therewith.

The air flowing from the pipeline 2 into the space defined by the advancing sleeve 4, is constantly withdrawn therefrom by the vacuum pump 25. The pressure drop is thus set across the sleeve 4 and the space beyond the piston 28, owing to which the sleeve 4 advances through the pipeline 2.

The amount of air coming into the pipeline 2 being equal to the amount of air evacuated therefrom, the sleeve 4 is relieved from the load that could otherwise cause its accidental bursting.

With suction created inside the pipeline 2, intermediate the piston 28 and the sleeve 4, the moisture remaining on the heated internal surface of the pipeline 2 is instantly evaporated, and the sleeve 4 is urged into intimate contact with this surface and becomes fused thereto.

Figure 3:
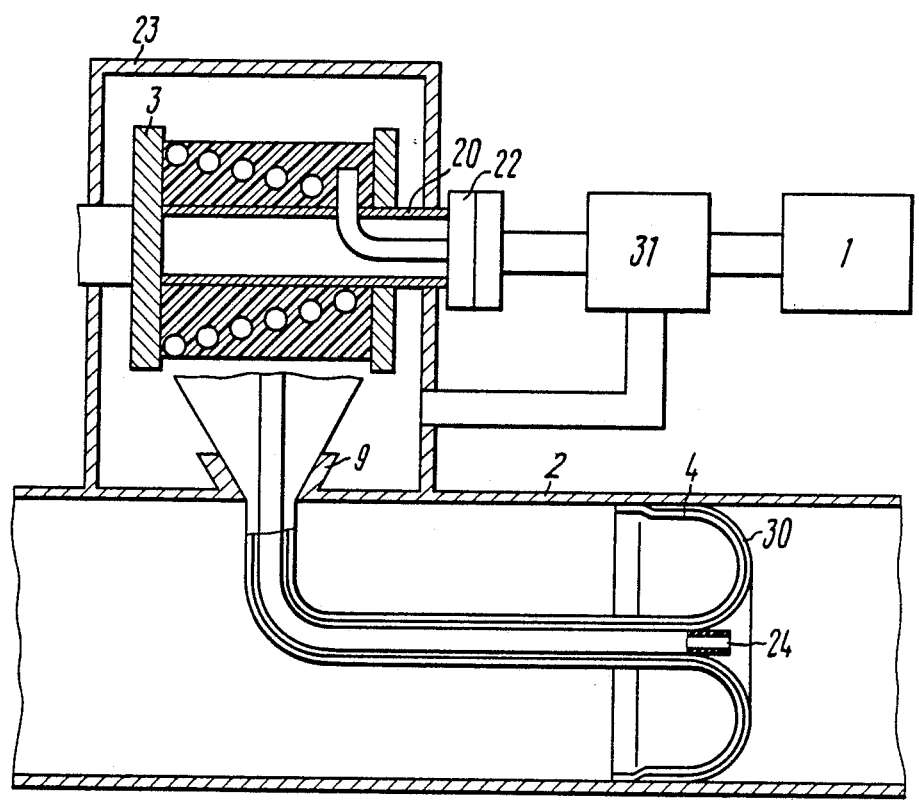
FIG. 3 illustrates yet another embodiment of the apparatus for protecting the internal surface of a pipeline against corrosion.

In the embodiment of the apparatus in accordance with the present invention, illustrated in FIG. 3, the sealed receptacle 23 accommodates the drum 3 with the supply of two coaxially arranged sleeves 4 and 30. The sleeve 30 is made of a polymeric material, e.g. polyethylene, and the sleeve 4 is made of a woven cloth. The sleeve 30 communicates with the hose 24 wound on the drum 3 and connected through the hollow shaft 20 of the drum 3 and through the rotative seal 22 to the heating means which in the presently described embodiment includes a heat-exchanger 31 communicating with the system 1 for feeding the working fluid under pressure (e.g. compressed air) into the pipeline 2. The heat-exchanger 31 also communicates with the sealed receptacle 23.

The apparatus illustrated in FIG. 3 operates as follows.

The system 1 is operated to supply hot compressed air into the sleeve 30, and through the open end of the hose 24 into the inner space of the pipeline 2 in front of the sleeve 4. The sleeves 4 and 30 are thus advanced through the pipeline 2. When flowing in the sleeve 30, the hot compressed air heats it and the wall of the pipeline 2 in front of the sleeves 4 and 30. The excessive pressure of compressed air urges the sleeves 4, 30 into contact with the internal surface of the pipeline 2, while the hot air fed into the pipeline 2 in front of the advancing sleeve 4 continues heating the sleeves 4, 30 and the internal surface of the pipeline 2 in front of them. The sleeve 30 melts, and upon the pipeline 2 subsequently cooling down, the sleeve 30 becomes firmly fused with the internal surface of the pipeline 2 and with the woven sleeve 4.

Figure 4:
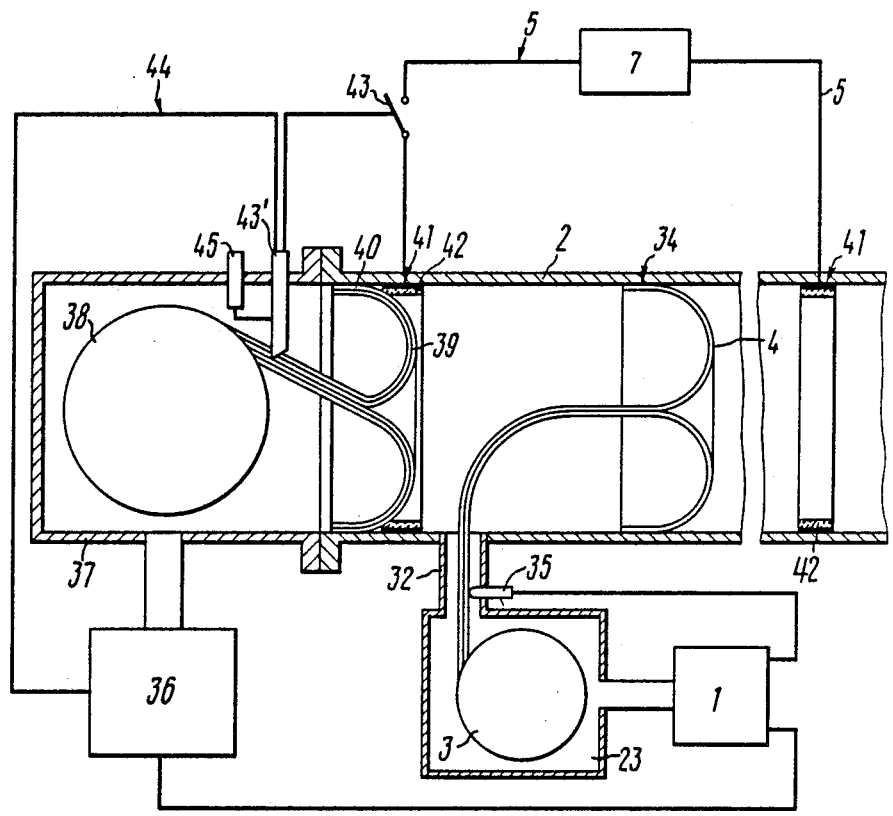
FIG. 4 illustrates still another embodiment of the apparatus for protecting the internal surface of a pipeline against corrosion.

The embodiment of the appartus according to the present invention, illustrated in FIG. 4, comprises the sealed receptacle 23 accommodating the drum 3 with a supply of the sleeve 4 whose end has been put in advance through a tube 32, turned inside out and secured to the internal surface of the pipeline 2 with an adhesive 34, e.g. epoxy resin. The sleeve 4 can be of a polymeric material, e.g. polyethylene, of metal foil, e.g. aluminum foil, or of glass fibre fabric.

The receptacle 23 communicates with the system 1 for supplying the working fluid into the inner space of the sleeve 4, e.g. in the form of a gas generator, and is also electrically connected to a contact pickup 35 and a system 36 for feeding the working fluid ito a sealed chamber 37 accommodating a drum 38 with a supply of sleeve 39 carrying heating elements 40, e.g. in the form of longitudinal strips of a nickel-chrome alloy. A gas generator may be used as the system 36. The pipeline 2 has munted theeinside insulation gaskets 41 supporting annular contacts 42. The annular contacts 42 are connected to the power source 7 through the power cable 5 incorporating a switch 43. A limit switch 43' is associated with the sleeve 39 and is electrically connected through another power cable 44 with the switch 43 and with the system 36 for supplying the working fluid. The end of the sleeve 4 on the drum 3 is sealed and has small orifices (1-2 mm) made therethrough, these orifices being intended for the outlet of air, for maintaining inside the sleeve 4 the required pressure as the sleeve 39 advances in the sleeve 4. The sealed chamber 37 further accommodates a temperature transducer 45 electrically connected with the switch 43.

The apparatus illustrated in FIG. 4 operates as follows.

The system 1 is operated to supply compressed air into the pipeline 2. The sleeve 4 becomes inflated and advances through the pipeline 2 in contact with its internal wall. As the supply of the sleeve 4 on the drum 3 becomes exhausted, the contact pickup 35 responds and sends an electric signal to the system 1 which is turned off and to the system 36 which is turned on. Compressed air is supplied by the latter to advance and inflate the sleeve 39 which becomes turned inside out in its advance and presses the heating elements 40 against the sleeve 4 in engagement with the internal wall of the pipeline 2. The sleeve 39 compresses air inside the sleeve 4 which is thus advanced further on in the pipeline 2, in intimate contact with its internal surface. As the supply of the sleeve 39 on the drum 38 becomes exhausted, the limit switch 43' responds and turns off the system 36. As the sleeve 39 engages the other annular contact 42, the heating elements 40 close the circuit of the power source 7 and become heated.

The energized heating elements 40 heat up the sleeve 4 and the internal surface of the pipeline 2. With the pipeline 2 heated to the predetermined temperature, the temperature transducer 45 responds and disconnects the heating elements 40 from the power source 7. Compressed air is let out from the pipeline 2, and the sleeve 39 is withdrawn by being wound back onto the drum 38.

Figure 5:
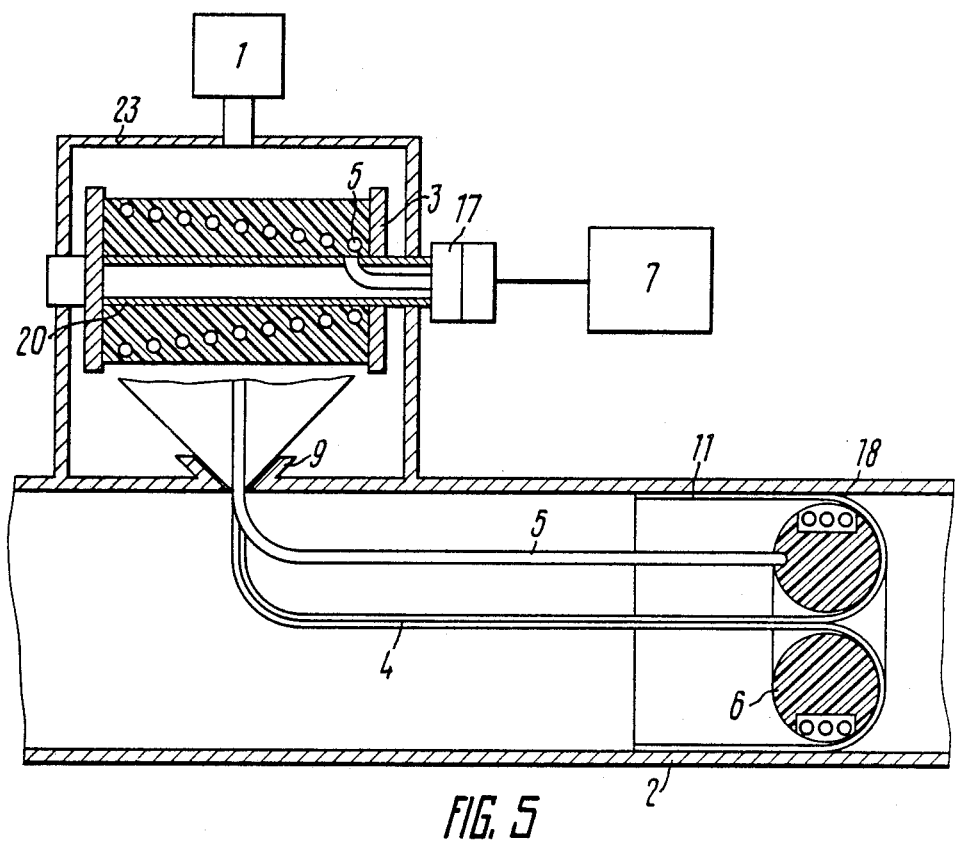
FIG. 5 illustrates an apparatus for protecting the internal surface of a pipeline against corrosion, wherein the heating means is received inside the sleeve.

The embodiment of the apparatus in accordance with the present invention, illustrated in FIG. 5, includes a sealed receptacle 23 accommodating the drum 3 with a supply of the sleeve 4 and the power cable 5 extending through the hollow shaft 20 of the drum 3 and connected to the electric contact means 17 connected, in its turn, to the source 7 of electric current mounted outside the pipeline 2. The sleeve 4 can be made of a polymeric material, e.g. plyethylene, of metal foil, e.g. aluminum foil, or of glass fibre fabric. The sleeve 4 and the cable 5 are introduced in advance into the pipeline 2, the end of the sleeve 4 being turned inside out and secured to the internal surface of the pipeline 2.

The sleeve 4 receives the annular oven 6 which in the presently described embodiment is shaped as a thoroid having the induction heater 18 mounted on its periphery and electrically connected via the power cable 5 to the source 7 of electric current. The thoroid is made of an antifriction dielectric material, e.g. of fluoroplastic. The system 1 for supplying the working fluid communicates with the internal space of the sealed receptacle 23.

The apparatus illustrated in FIG. 5 operates as follows.

Voltage is supplied via the power cable 5 to the induction heater 18 which heats locally the internal surface of the pipeline 2. The system 1 is operated to feed compressed air into the pipeline 2, to press the sleeve 4 against the heated internal surface of the pipeline 2. The sleeve 4 melts and, upon having been air-cooled, becomes fused to the internal surface of the pipeline 2. The pressure of compressed air pumped into the pipeline 2 advances the sleeve 4 and the annular oven 6 it contains along the pipeline 2, the housing of the annular oven 6 smoothing out the sleeve 4 on the internal wall of the pipeline 2.

Figure 6:
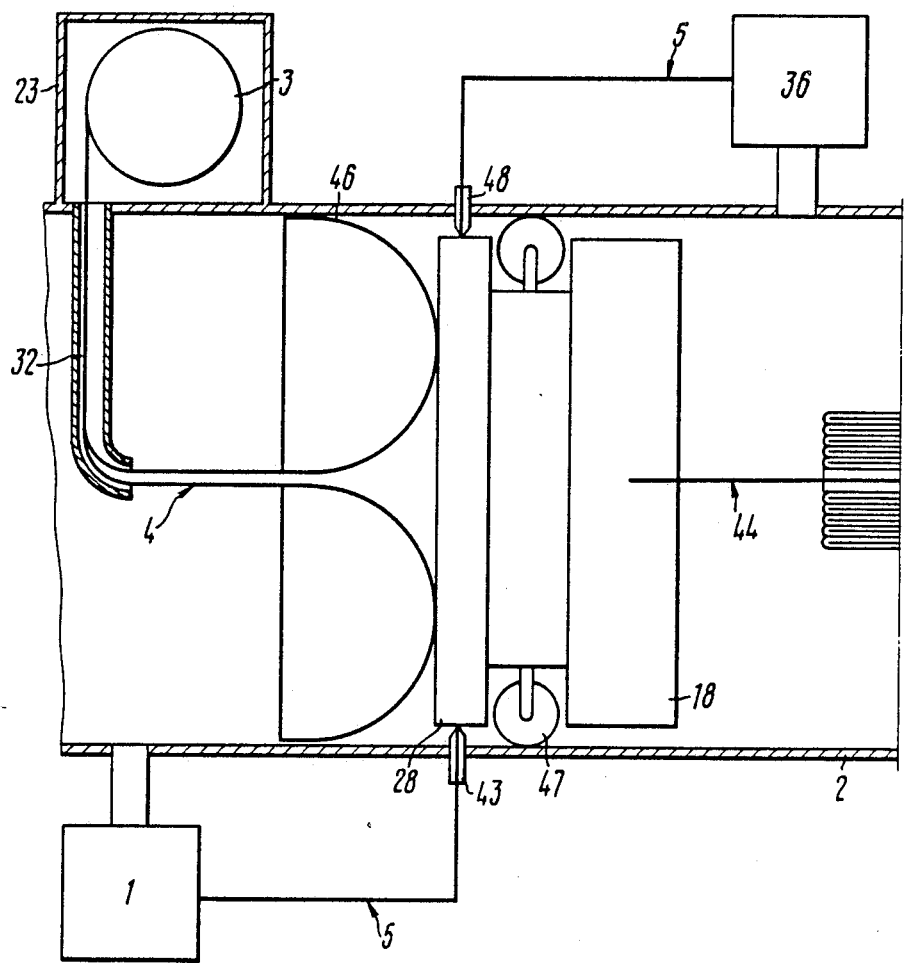
FIGS. 6, 7 and 8 illustrate yet another embodiment of the apparatus for protecting the internal surface of a pipeline against corrosion.
Figure 7:
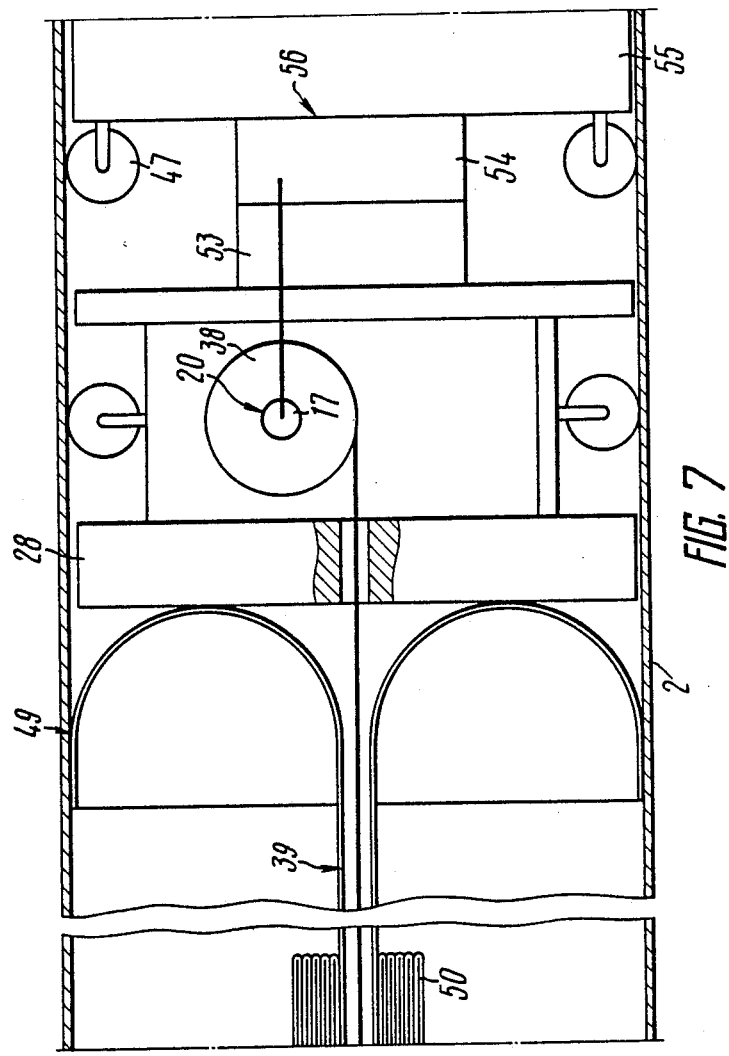
Figure 8:
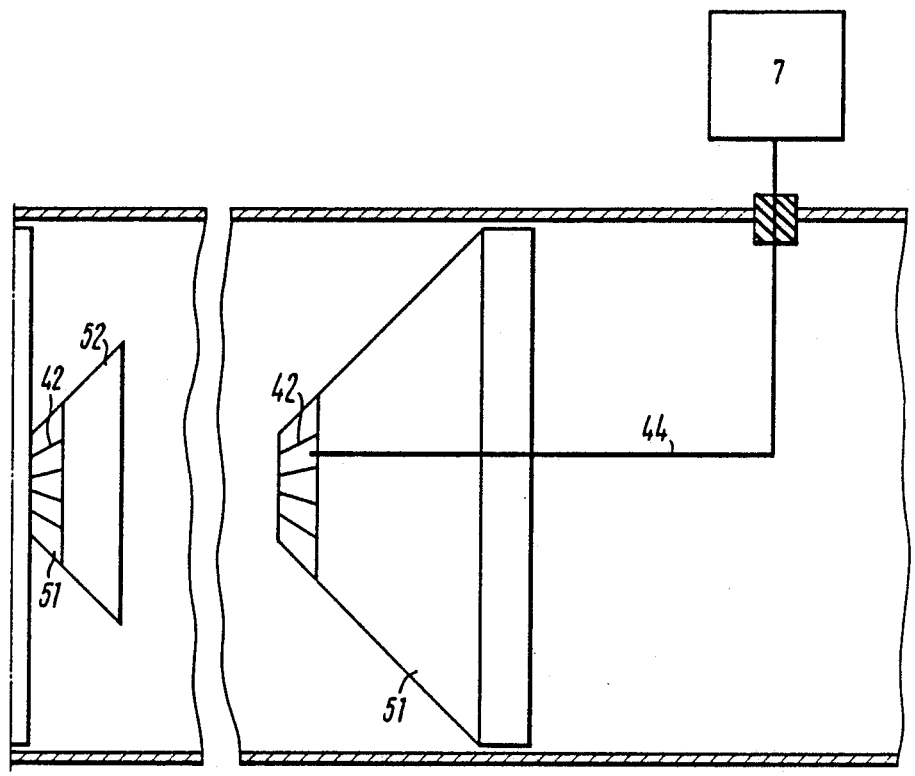

The embodiment of the apparatus in accordance with the present invention, illustrated in FIGS. 6, 7, 8 comprises the drum 3 with a supply of the sleeve 4, accommodated in the sealed receptacle 23. An end 46 of the sleeve 4 is put in advance through the guiding tube 32, turned inside out and secured to the internal surface of the pipeline 2. The pipeline 2 communicates with the system 1 for supplying the working fluid, whose operation is controlled by the limit switch 43 electrically connected with the system 1 via the power cable 5. The piston 28 of the induction heater 18 with its rollers 47 is adapted to engage limit switches 43 and 48. The limit switch 48 is electrically connected via the power cable 5 to the system 36 for supplying the working fluid, communicating with the inner space of the pipeline 2 in front of the induction heater 18. The induction heater 18, in its turn, is operatively connected with the drum 38 through a cable 44 extending through the sleeve 39. An end 49 of the sleeve 39 is turned inside out and secured to the internal wall of the pipeline 2. The supply of the sleeve 39 is pleated inside the pipeline 2, in a stack 50. The cable 44 extends through the piston 28 engaged by the end of the sleeve 39, and is wound about the drum 38, while its end extends through the latter's hollow shaft for electric connection with the contact means 17, and through it—with the contacts 42 mounted in a cone 51 of a catching device 52. The drum 38 is operatively connected through a reduction gearing 53 with an electric motor 54 interacting with a cam brake 55 through a coupling 56. The cone 51 with the contacts 42 is accommodated inside the pipeline 2, the contacts 42 being electrically connected through the cable 44 with the source 7 of electric current.

The apparatus illustrated in FIGS. 6, 7 and 8 operates as follows.

The system 36 is operated to feed compressed air into the pipeline 2. The sleeve 39 becomes inflated and advances through the pipeline 2 in engagement with its internal wall, the end of the sleeve 39 pushing forward the piston 28 and the drum 38.

As the cone 51 of the catching device 52 engages its counter-part, the contacts 42 close, and voltage is supplied to the electric motor 54 actuating the drum 38 and the cam brake 55. The drum 38 is rotated to wind up the cable 44, while the cam brake 55 retains the drum 38 against motion in the pipeline 2. Electrical current flows via the cable 44 to the induction heater 18 which heats up the internal wall of the pipeline 2, fusing the sleeve 39 urged against this internal wall. The pull of the cable 44 moves the induction heater 18 in the pipeline 2. As the piston 28 releases the limit switches 43 and 48, the system 36 is turned off, and the system 1 is turned on. Compressed air is fed into the sleeve 4 which pushes the piston 28 and advances along the pipeline 2, the sleeve 4 being urged against the fused sleeve 39 and subsequently cooling down, fuses with the internal surface of the pipeline 2.

Figure 9:
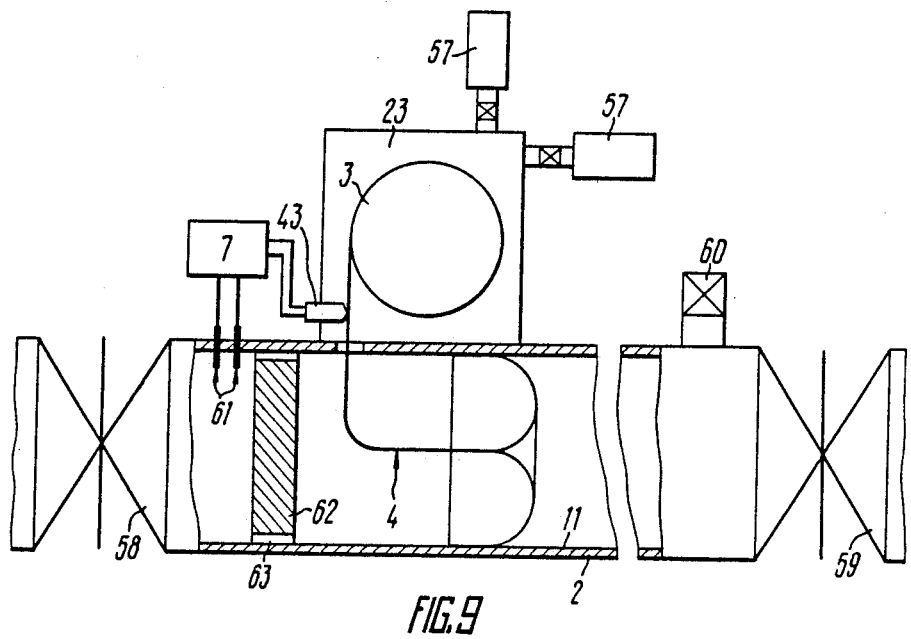
FIG. 9 illustrates another embodiment of the apparatus for protecting the internal surface of a pipeline against corrosion.

The embodiment of the apparatus in accordance with the present invention, illustrated in FIG. 9, comprises a means for supplying a combustible mixture into the space defined by the pipeline 2 and the sleeve 4. The means includes cylinders 57, respectively, with a fuel gas (propane) and oxygen (or compressed air), communicating via appropriate pressure-reducing valves with the sealed receptacle 23 accommodating the drum 3 with a supply of the sleeve 4. The sleeve 4 can be made of a polymeric material, e.g. plyethylene, of metal foil, e.g. aluminum foil, or of glass fibre fabric. The end of the sleeve 4 is turned inside out in advance and secured to the internal wall of the pipeline 2 provided at its opposite ends with appropriate gate valves 58, 59 and a safety (pressure-relief) valve 60.

The limit switch 43 is mounted inside the sealed receptacle 23, engaging the sleeve 4 and being electrically connected with the source 7 of electric current, which latter is electrically connected also with an ignition device 61. Received in the pipeline 2 behind the sleeve 4 is a torch in the form of a piston 62 with slots 63 cut in the periphery thereof.

The apparatus illustrated in FIG. 9 operates as follows.

Oxygen and fuel gas are fed under pressure from the respective cylinders 57 into the sealed receptacle 23. The pressure of the gases being fed advances the sleeve 4 through the pipeline 2; urging the sleeve 4 against the internal surface of the pipeline 2.

As the sleeve 4 thus advances, it compresses in front of it the air contained in the pipeline 2. As the pressure in front of the advancing sleeve 4 is built up above the predetermined value, the pressure-relief valve 60 releases the excessive gas (combustible mixture) into the atmosphere. With the sleeve 4 completely paid off the drum 3, the limit switch 43 responds, sending an electric signal to the ignition device 61. The combustible mixture behind the torch-piston 62 becomes ignited, and the piston 62 moves along the pipeline 2, compressing the combustible mixture in front of it, and the combustible mixture advances the sleeve 4 still further in the pipeline 2.

Some of the combustible mixture flows through the slots 63 of the piston 62 and burns close to the internal wall of the pipeline 2, melting the sleeve 4 and locally heating the internal wall of the pipeline 2. Owing to the fusing of the sleeve 4, the internal surface of the pipeline 2 becomes uniformly coated, e.g. with a polymer layer.

Figure 10:
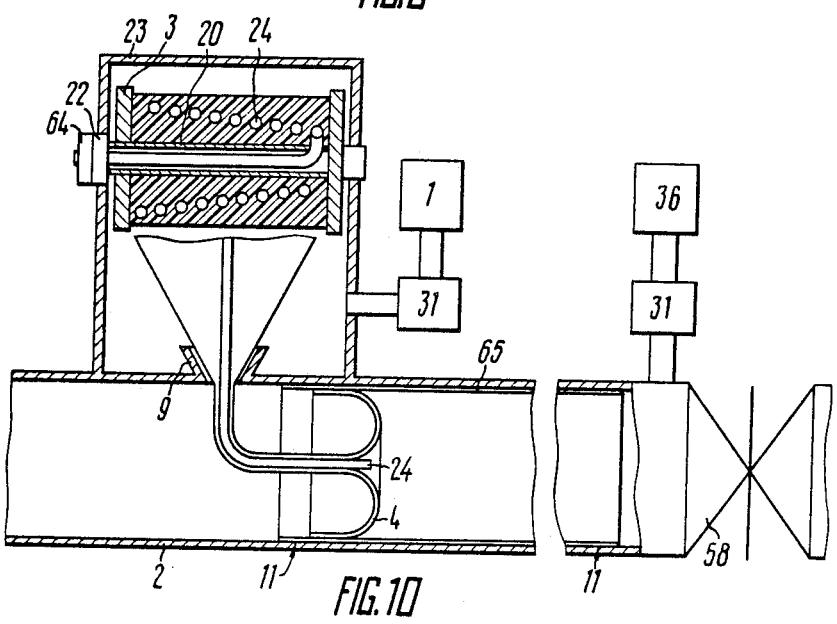
FIG. 10 illustrates an apparatus for protecting the internal surface of a pipeline against corrosion, wherein the heating means is made in the form of a gas generator.

The embodiment of the apparatus according to the present invention, illustrated in FIG. 10, comprises the sealed receptacle 23 accommodating the drum 3 with a supply of the sleeve 4, e.g. of polyethylene, receiving the hose 24 which communicates thorugh the hollow shaft 20 of the drum 3 and the seal 22 with the atmosphere. The shaft 20 is journalled for rotation in bearings 64.

The end 11 of the sleeve 4 is turned inside out and secured to the internal surface of the pipeline 2, onto which another film sleeve 65 has been applied in advance, with its end secured to this surface. The pipeline 2 has the gate valve 58 mounted in it. The system 36 for supplying the working fluid (compressed air) communicates with the pipeline 2 via the heat-exchanger 31. The system 1 for supplying the working fluid is likewise connected through the heat-exchanger 31 with the sealed receptacle 23.

The apparatus illustrated in FIG. 10 operates as follows.

The systems 1 and 36 are operated to feed compressed hot air into the pipeline 2 from the opposite ends. The sleeve 4 is urged against the internal surface of the pipeline 2 and advances therealong. The hot air heats up the internal wall of the pipeline 2 and the sleeve 65 which starts melting.

The hot air flows through the sleeve 4, hose 24 and shaft 20, and goes out into the atmosphere. Owing to the feed of hot air from both sides into the pipeline 2, the pressure built up in the pipeline 2 urges the sleeves 4 and 65 against the internal surface thereof. With the sleeve 4 having covered the entire predetermined length of the pipeline 2, the heat-exchangers 31 and the system 36 are turned off. The gate valve 58 is opened, and the system 1 is operated to drive air through the pipeline 2. When the internal surface of the pipeline 2 cools down, the sleeves 4 and 65 fuse together and with the internal wall of the pipeline 2.

Figure 11:
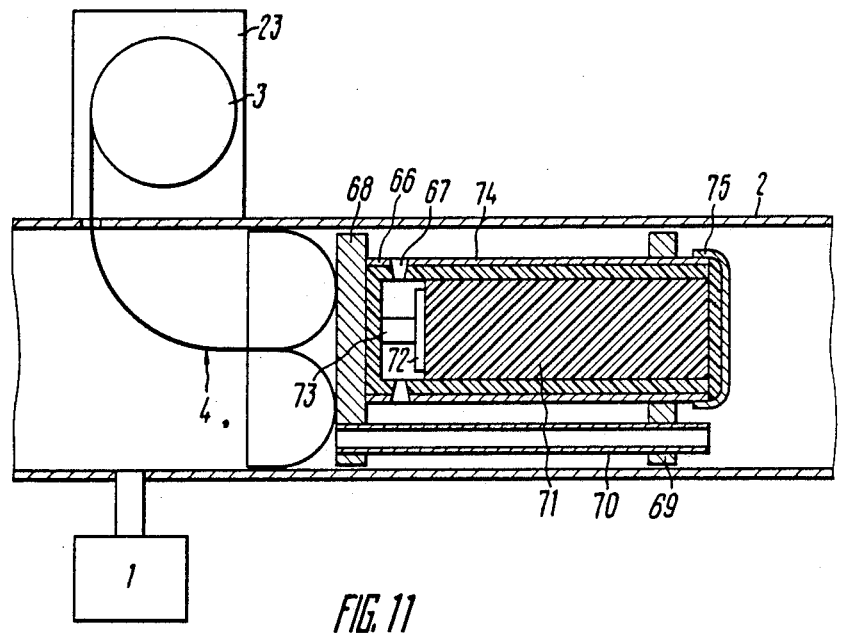
FIG. 11 illustrates an apparatus for protecting the internal surface of a pipeline against corrosion, wherein the heating means is made in the form of rocket engine.

The embodiment of the apparatus according to the present invention, illustrated in FIG. 11, comprises the sealed receptacle 23 accommodating the drum 3 with a supply of the sleeve 4 made of a polymeric material, e.g. polyethylene, of metal foil, e.g. aluminum foil, of glass fibre fabric or of some other thermally fusible material. The heating means of this embodiment includes a rocket engine 66 accommodated inside the pipeline 2 in front of the advancing sleeve 4, its nozzles 67 facing the internal surface of the pipeline 2. The end portion of the rocket engine 66 supports a piston 68 engaged by the advancing sleeve 4.

Another piston 69 encompasses the periphery of the rocket engine 66. The lower portions of the pistons 68, 69 have mounted therein a through-going tube 70 establishing communication between the spaces of the pipeline 2 at both sides of the rocket engine 66.

The rocket engine 66 accommodates a solid fuel charge 71, an igniter 72 and an ignition devie 73. A housing 74 of the rocket engine 66 is sealingly closed with a lid 75.

The apparatus illustrated in FIG. 11 operates as follows.

The system 1 is operated to feed compressed air into the pipeline 2, and the sleeve 4 is advanced through the pipeline 2, pushing the rocket engine 66 in front of it.

Voltage is fed to the ignition device 73, so that the igniter 72 initiates the burning of the fuel charge 71.

With the charge 71 burning, gases emitted through the nozzles 67 heat up the internal wall of the pipeline 2. While passing through the gap defined by the internal surface of the pipeline 2 and the piston 68, they heat the sleeve 4 urged by the air pressure against the internal wall of the housing 2, so that upon cooling the sleeve 4 is firmly secured to the internal surface of the pipeline 2.

After having contacted the sleeve 4, the gases flow through the tube 70 into the space of the pipeline 2 in front of the rocket engine 66, drying up the moisture in this space. While passing between the sleeve 4 and the piston 68, they create a gas cushion facilitating the sliding of the sleeve 4 against the piston 68.

Figure 12:
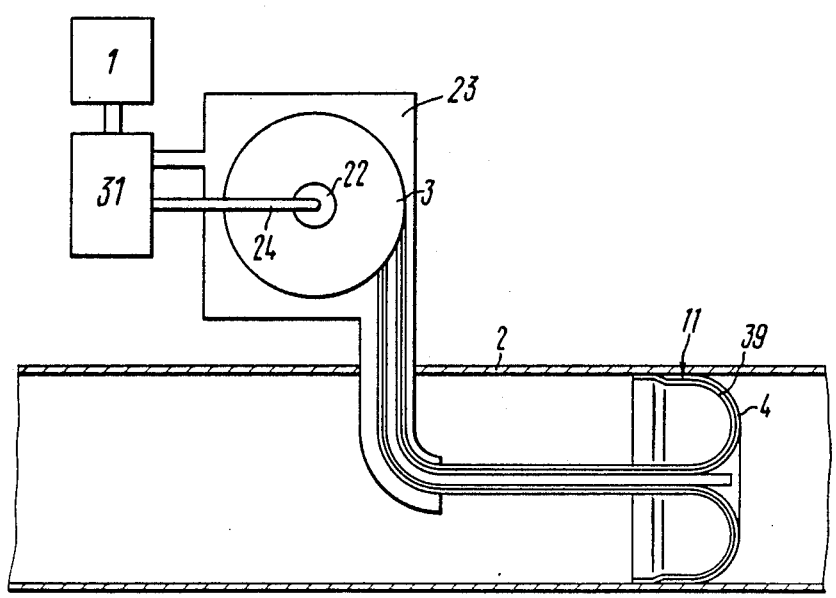
FIG. 12 illustrates a further embodiment of the apparatus for protecting the internal surface of a pipeline against corrosion.

The embodiment of the apparatus in accordance with the present invention, illustrated in FIG. 12, comprises the sealed receptacle 23 accommodating the drum 3 with supplies of the sleeves 4 and 39.

The sleeve 4 is made of a polymeric material, e.g. polyethylene, while the sleeve 39 is made, e.g., carbon-filled plastic, cotton fabric. The sealed receptacle 23 communicates with the pipeline 2. The respective ends 11 of the sleeves 4, 39 are turned inside out and secured to the internal surface of the pipeine 2.

The system 1 for supplying the working fluid communicates with the sealed receptacle 23 through a heat-exchanger 31.

The polymer sleeve 4 communicates through the hose 24 with the heat-exchanger, the hose 24 passing through the hollow shaft 20 (not shown in FIG. 12) of the drum 3 and through the rotative seal 22.

The apparatus operates as follows.

The system 1 is operated to feed compressed air into the heat exchanger 31, and the hot compressed air flows via the hose 24 inside the sleeve 4 into the space of the pipeline 2 in front of the sleeve 4, the hot air heating up the sleeves 4 and 39, as well as the internal wall of the pipeline 2. The sleeves 4, 39 are urged by the air pressure against the internal surface of the pipeline 2. The heating melts the polymer sleeve 4, and the melt fills up the pores of the woven sleeve 39. Upon cooling down the pipeline 2, the polymer sleeve 4 and the woven sleeve 39 beome firmly bonded together and fused to the internal surface of the pipeline 2.

Figure 13:
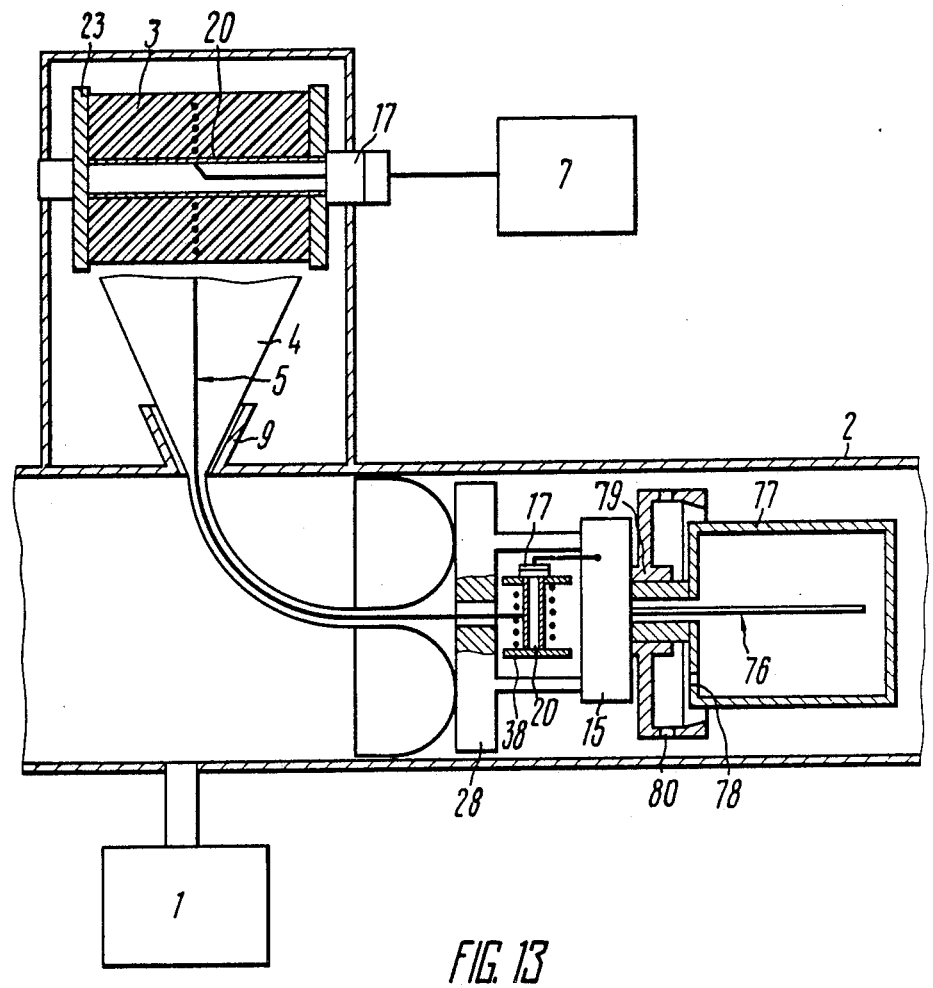
FIG. 13 illustrates a modification of the apparatus embodying the invention.

The embodiment of the apparatus according to the present invention, illustrated in FIG. 13, comprises the drum 3 accommodated in the sealed receptacle 23 communicating with the pipeline 2. The drum 3 has wound thereabout a supply of the sleeve 4 receiving therein the power cable 5 extending through the hollow shaft 20 of the drum 3 and electrically connected through the contact means 17 to the source 7 of electric current. The system 1 is adapted to supply compressed air into the pipeline 2. The end of the sleeve 4 is turned inside out and secured to the internal wall of the pipeline 2. The power cable 5 is wound onto the drum 38, with the cable 5 extending through the hollow shaft 20 of the drum 38 and being connected to rotative contact means 17, to supply voltage to the drive motor 15 and heating means 76 accommodated in a sealed receptacle 77 with orifices 78.

A bladed centrifuge 79 is mounted on the shaft of the motor 15, its housing having metering-out openings 80. The sleeve 4 engages the piston 28 rigidly joined to the receptacle 77 for melting a metal, e.g. aluminum-base alloy, having a negative potential relative to the metal of the pipeline 2.

The apparatus illustrated in FIG. 13 operates as follows.

The receptacle 77 is filled with aluminum alloy powder. Prior to starting the apparatus, voltage is fed to the heaters 76 to melt the aluminum powder. The melt flows and enters the centrifuge 79 via the orifices 78. With the required amount of the metallic powder having melted, the motor 15 is energized to rotate the centrifuge 79, so that the melt is sprayed through the openings 80 onto the internal surface of the pipeline 2.

The system 1 engaged to feed compressed air into the pipeline 2. The sleeve 4 is thus advanced in the pipeline 2, pushing the piston 28 in front of it. The necessary length of the power cable 5 is paid off the drum 38, while an additional length of the power cable 5 is paid off the drum 3 jointly with the sleeve 4.

The power required for melting the aluminum alloy powder is supplied by the source 7.

The molten metal engages the internal surface of the pipeline 2 and cools down, heating up the internal surface of the pipeline 2 preheated by the passage of the receptacle 77. Upon engaging this heated internal surface of the pipelie 2, the sleeve 4 melts and forms a strong polymer coating overlying the layer of the aluminum alloy which, should the sleeve 4 become punctured or worn out in service, offers cathode protection of the pipeline 2.

Most effectively the present invention can be used for protecting the internal surface of pipelines made of steel, iron, reinforced concrete in the public, industrial and melioration water supply. The invention can also be used in chemical, food, petroleum-gas industries and in central heating and power engineering as well.

We claim:

1. An apparatus for protectng the internal surface of a pipeline against corrosion, comprising a system (1) for supplying a working fluid into the pipeline (2), a system for introducing a flexible sleeve (4) into the pipeline (2), means for heating the pipeline (2) and a system for timing the motion of the flexible sleeve (4) and of the heating means, characterized in that said heating means includes an induction heater (18) mounted for longitudinal motion in front of the advancing sleeve and electrically connected via a power cable (44) with a source (7) of electric current, an additional flexible sleeve (39) being arranged in front of the induction heater (18), with the power cable (44) extending through this additonal sleeve (39).

2. An apparatus for protecting the internal surface of a pipeline against corrosion, comprising a system (1) for supplying a working fluid into the pipeline (2), a system for introducing a flexible sleeve (4) into the pipeline (2), means for heating the pipeline (2) and a system for timing the motion of the sleeve (4) and of the heating means, characterized in that said heating means includes a gas generator communicating with the space defined by the pipeline (2) and the sleeve (4) and with the space in front of the advancing sleeve (4), the sleeve (4) extending inside an additional sleeve (39) whose melting point is higher than the melting point of the inner sleeve (4).

* * * * *